US012523494B2

(12) United States Patent
Lerner

(10) Patent No.: US 12,523,494 B2
(45) Date of Patent: Jan. 13, 2026

(54) SYSTEMS AND METHODS FOR GENERATING HEAT MAPS

(71) Applicant: Woven by Toyota, Inc., Tokyo (JP)

(72) Inventor: Emily Lerner, Ypsilanti, MI (US)

(73) Assignee: WOVEN BY TOYOTA, INC., Tokyo (JP)

( * ) Notice: Subject to any disclaimer, the term of this patent is extended or adjusted under 35 U.S.C. 154(b) by 201 days.

(21) Appl. No.: 18/368,773

(22) Filed: Sep. 15, 2023

(65) Prior Publication Data
US 2025/0093176 A1    Mar. 20, 2025

(51) Int. Cl.
*G01C 21/00*    (2006.01)

(52) U.S. Cl.
CPC ..... *G01C 21/3815* (2020.08); *G01C 21/3841* (2020.08); *G01C 21/387* (2020.08)

(58) Field of Classification Search
CPC ............ G01C 21/3815; G01C 21/3841; G01C 21/387
USPC ......................................................... 701/532
See application file for complete search history.

(56) References Cited

U.S. PATENT DOCUMENTS

| | | | |
|---|---|---|---|
| 8,694,241 | B1 | 4/2014 | Kadous et al. |
| 9,251,277 | B2 | 2/2016 | Hampapur et al. |
| 9,494,440 | B2 | 11/2016 | Sofinski et al. |
| 10,163,255 | B2 | 12/2018 | Sorrento |
| 10,533,872 | B2 | 1/2020 | Moore et al. |
| 2010/0332131 | A1* | 12/2010 | Horvitz ............. G01C 21/3697 701/414 |
| 2012/0150436 | A1* | 6/2012 | Rossano ............ G01C 21/3694 701/425 |
| 2014/0303806 | A1* | 10/2014 | Bai ..................... G01C 21/3697 701/1 |
| 2015/0347478 | A1* | 12/2015 | Tripathi ................ G06F 16/248 707/743 |
| 2018/0233042 | A1* | 8/2018 | Zhang .............. G08G 1/096791 |
| 2019/0316309 | A1* | 10/2019 | Wani ..................... G06F 3/0484 |
| 2020/0406925 | A1* | 12/2020 | Du ......................... G06F 16/29 |

(Continued)

FOREIGN PATENT DOCUMENTS

KR        102385866 B1    4/2022

OTHER PUBLICATIONS

Kshitij Dixit, "Making Navigation Easy—Using Waze for Navigation", May 6, 2023, Zeo Route Planner (Year: 2023).*

*Primary Examiner* — Hunter B Lonsberry
*Assistant Examiner* — Helen Li
(74) *Attorney, Agent, or Firm* — DINSMORE & SHOHL LLP

(57) ABSTRACT

A system for generating a heat map corresponding to a difficult road topography includes one or more processors, network interface hardware, and one or more memory modules. When the machine-readable instructions are executed by the one or more processors, the system is caused to: receive vehicle swarm data related to at least the vehicle performance and the vehicle occupant, wherein at least a portion of the vehicle swarm data is generated by one or more vehicle sensors mounted to a vehicle of a vehicle swarm; determine the difficult road topography based on the vehicle swarm data; generate a heat map of the difficult road topography, wherein the heat map is based upon an aggregate number of times that a determination is made that a location has difficult road topography; and provide the heat map to a user though a user device.

18 Claims, 5 Drawing Sheets

(56) References Cited

U.S. PATENT DOCUMENTS

| | | | |
|---|---|---|---|
| 2022/0044034 A1* | 2/2022 | RoyChowdhury | E01C 23/01 |
| 2023/0067558 A1* | 3/2023 | Abe | G06F 16/29 |

* cited by examiner

SYSTEMS AND METHODS FOR GENERATING HEAT MAPS

TECHNICAL FIELD

The present specification generally relates to systems and methods for generating heat maps and, more specifically, systems and methods for collecting data from a swarm of vehicles and providing a heat map corresponding to a difficult road topography.

BACKGROUND

New roads and routes are built by studying terrain and constraints including buildings, crossing, rivers, utilities, soils and historical data. Further, new construction has to meet rigorous standards and regulations. When building a road, one may also consider how a vehicle may navigate through road conditions. When updating infrastructure, there is a need to know how current vehicles perform, or where issues are located as to adequately distribute resources. Navigating through complex road conditions, such as sharp curves, strange junctions, and short ramps, can pose challenges to both human drivers and autonomous vehicles. Existing navigation systems often lack real-time information about such challenging road features, leading to increased risks of accidents and suboptimal route planning.

Accordingly, a need exists for alternative systems and methods for providing a data driven heat map to identify areas for road improvements for enhanced safety and driving experience.

SUMMARY

In one embodiment, a system for generating a heat map corresponding to a difficult road topography includes one or more processors, network interface hardware, and one or more memory modules. The network interface hardware is communicatively coupled to the one or more processors. The one or more memory modules are communicatively coupled to the one or more processors and store machine-readable instructions. When the machine-readable instructions are executed by the one or more processors, the system is caused to: receive vehicle swarm data related to at least the vehicle performance and the vehicle occupant, wherein at least a portion of the vehicle swarm data is generated by one or more vehicle sensors mounted to a vehicle of a vehicle swarm; determine the difficult road topography based on the vehicle swarm data; generate a heat map of the difficult road topography, wherein the heat map is based upon an aggregate number of times that a determination is made that a location has difficult road topography; and provide the heat map to a user though a user device.

In another embodiment, a method for generating a heat map corresponding to a the difficult road topography includes: receiving vehicle swarm data related to at least a vehicle performance and a vehicle occupant, wherein at least a portion of the vehicle swarm data is generated by one or more vehicle sensors mounted to a vehicle of a vehicle swarm; determining the difficult road topography based on the vehicle swarm data; generating a heat map of the difficult road topography, wherein the heat map is based upon an aggregate number of times that a determination is made that a location has difficult road topography; and providing the heat map to a user though a user device.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
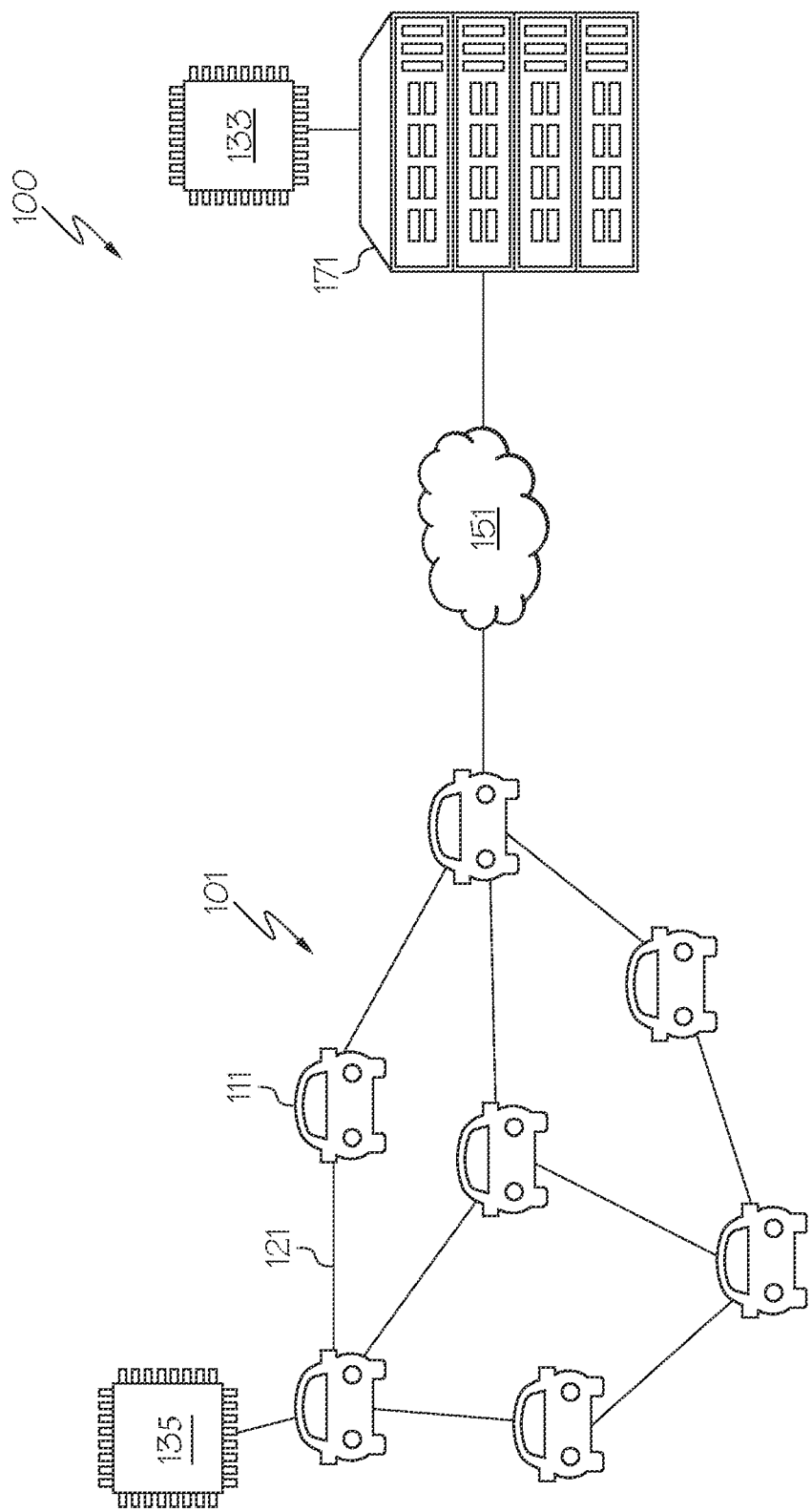
FIG. 1 schematically depicts an example system for generating a heat map, according to one or more embodiments shown and described herein.

Embodiments disclosed herein are directed to systems and methods for generating heat maps corresponding to map topographies with areas to avoid or for road improvements. A heat map is a visual representation of data where values are represented in color. The display of the distribution and intensity of phenomena across a map or grid visually highlights areas of higher concentration. Particularly, a heat map may visually present challenging road topography data collected from sensors of a vehicle. A plurality of vehicles, or vehicle swarm provides data reflecting driving behaviors, environmental conditions, accelerations, braking events, steering wheel angles, and crash related information. Based on the data, the system may generate a difficult road topography. For example detecting harsh lateral accelerations by drivers, the system may identify a strange junction. The system may aggregate the identified difficult road topographies to generate a heat map. The heat map enables users such as human drivers and autonomous vehicles to navigate safely and avoid difficult road sections. Further, civil engineers and urban planners can leverage the heat map to prioritize road improving projects, enhance road safety, allocate resources, and infrastructure. These and additional benefits and features will be discussed in greater detail below.

Various embodiments of the methods and systems for generating heat maps are described in more detail herein. Whenever possible, the same reference numerals will be used throughout the drawings to refer to the same or like parts.

As used herein, the singular forms "a," "an" and "the" include plural referents unless the context clearly dictates otherwise. Thus, for example, reference to "a" component includes aspects having two or more such components unless the context clearly indicates otherwise.

Turning to figures. FIG. 1 generally depicts one embodiment of an example system 100 for generating a heat map 700. The system 100 may include a greater or fewer number of components than depicted without departing from the scope of the present disclosure. The system 100 includes one or more vehicles 111 that form a vehicle swarm 101, a network 151, and a server 171. The vehicles 111 may communicate through a connection 121. In embodiments, the vehicles 111 of the vehicle swarm 101 may communicate with the server 171 through the network 151, such as a cloud, an internet, a cellular mobile network. WiFi, or satellite communication. The vehicles 111 of the vehicle swarm 101 may communicate with each other through dedicated short-range communications (DSRC), such as vehicle-to-vehicle (V2V) communications and vehicle-to-infrastructure (V2I), cellular vehicle-to-everything (X-V2X). WiFi based methods, cellular networks, or Ad Hoc network.

It is noted that while the vehicles 111 are generally disclosed as an automobile, the vehicles 111 may be any passenger vehicle such as, for example, a terrestrial, aquatic, and/or airborne vehicle. In some embodiments, the vehicles 111 may be an autonomous vehicle or a partially autonomous vehicle. When referring to autonomous or partially autonomous vehicles, it is meant to refer to vehicles having at least one drive mode wherein a human operator is not necessary to guide the vehicle 111.

Figure 2:
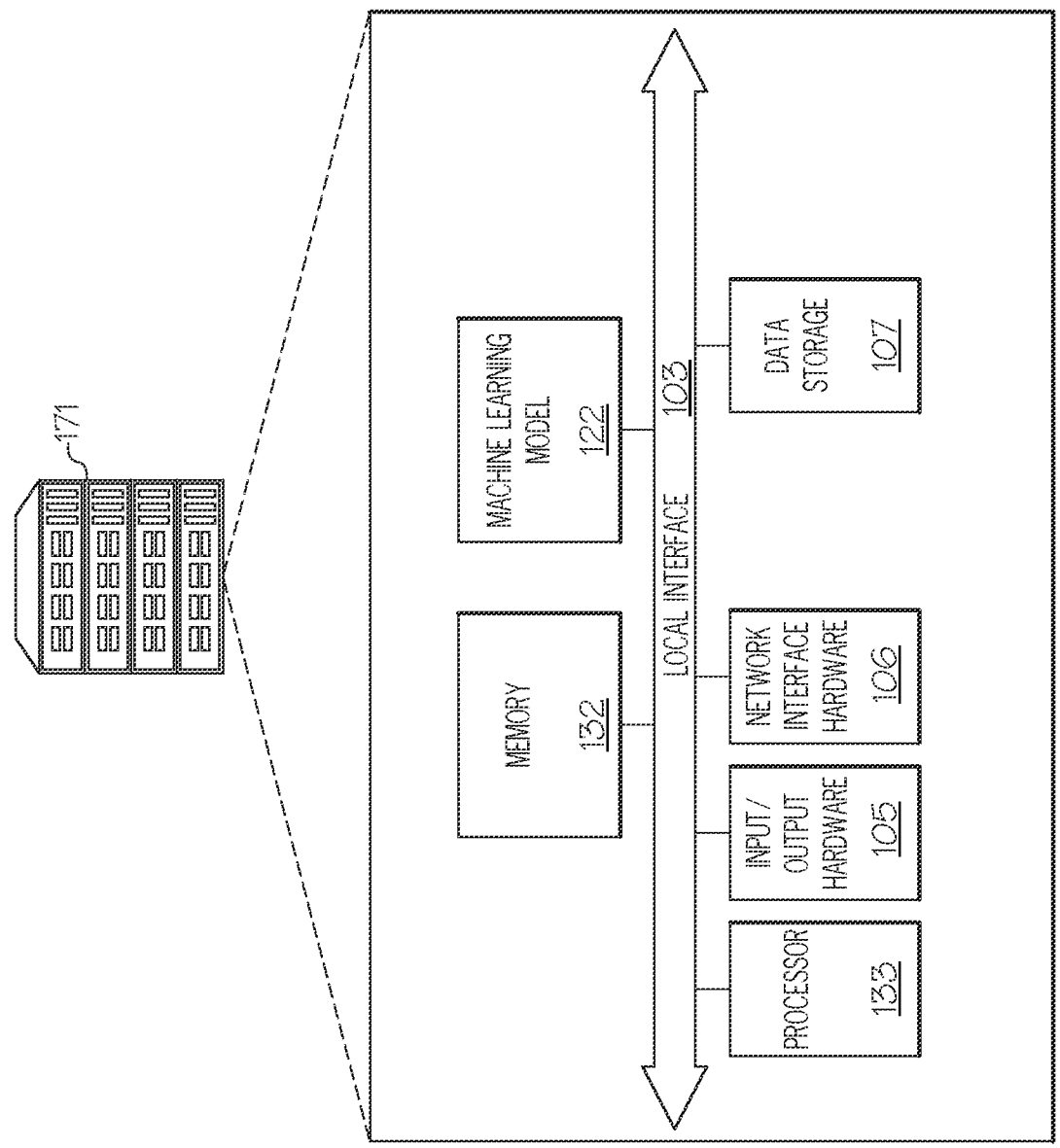
FIG. 2 schematically depicts non-limiting components of the devices on the server of the system for generating a heat map of FIG. 1, according to one or more embodiments shown and described herein.

Referring now to FIG. 2, non-limiting components of the devices on the server 171 of the system 100 for generating a heat map 700 are depicted. The server 171 may comprise various components, such as a memory 132, a processor 133, a machine-learning model 122, an input/output hardware 105, a network interface hardware 106, a data storage 107, and a local interface 103.

The server 171 may be any device or combination of components comprising a processor 133 and a memory 132, such as a non-transitory computer readable memory. The processor 133 may be any device capable of executing the machine-readable instruction set stored in the non-transitory computer readable memory. Accordingly, the processor 133 may be an electric controller, an integrated circuit, a microchip, a computer, or any other computing device. The processor 133 may include any processing component(s) configured to receive and execute programming instructions (such as from the data storage 107 and/or the memory 132). The instructions may be in the form of a machine-readable instruction set stored in the data storage 107 and/or the memory 132. The processor 133 is communicatively coupled to the other components of the server 171 by the local interface 103. Accordingly, the local interface 103 may communicatively couple any number of processors 133 with one another, and allow the components coupled to the local interface 103 to operate in a distributed computing environment. The local interface 103 may be implemented as a bus or other interface to facilitate communication among the components of the server 171. In some embodiments, each of the components may operate as a node that may send and/or receive data. While the embodiment depicted in FIG. 2 includes a single processor 133, other embodiments may include more than one processor 133.

The data storage 107 stores historical data including historical road data (e.g., crash, constructions, surveys, etc.), historical vehicle performance data, survey data, weather data, relevant reports, or other data relevant to a determination of the difficult road topography For example, a user may post to their social media that they are having trouble with a local intersection. In embodiments, this data may be data generated from the vehicle swarm 101.

In embodiments, the server 171 is configured to implement a machine-learning model 122. The machine-learning model 122 is a system that can learn from inputs and make predictions or decisions. Machine-learning models 122 are trained using a dataset. In embodiments, the machine-learning model 122 is configured to be trained using data transmitted through the network 151 to the server 171 or otherwise stored at the server 171, such as on the memory 132. The training data includes, but is not limited to the vehicle swarm data including vehicle performance data and vehicle occupant data and the data stored in the data storage 107, as described in more detail below.

The machine-learning model 122 may be or include supervised learning models, unsupervised learning models, semi-supervised learning models, reinforcement learning models, deep learning models generative models, transfer learning models, neural networks or the like. In embodiments, the server 171 is configured to use the machine-learning model 122 to input data and output a heat map 700 (FIG. 7). It should be understood that this process may be completed by any processor, including the one or more processors 133, 135 at the vehicle 111 or server 171.

The machine-learning model 122 can be one of a variety of models and algorithms. The following list of models is merely an example. The machine-learning model 122 implemented in the present embodiments may be a supervised learning model, an unsupervised learning model, a semi-supervised learning model, a reinforcement learning model, a deep learning model, a generative model, an adversarial network, a variational auto encoder, or the like.

The memory 132 (e.g., a non-transitory computer-readable memory component) may comprise RAM, ROM, flash memories, hard drives, or any non-transitory memory device capable of storing machine-readable instructions such that the machine-readable instructions can be accessed and executed by the processor 133. The machine-readable instruction set may comprise logic or algorithm(s) written in any programming language of any generation (e.g., 1GL, 2GL, 3GL, 4GL, or 5GL) such as, for example, machine language that may be directly executed by the processor 133, or assembly language, object-oriented programming (OOP), scripting languages, microcode, etc., that may be compiled or assembled into machine readable instructions and stored in the memory 132. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. For example, the memory 132 may be a machine-readable memory (which may also be referred to as a non-transitory processor-readable memory or medium) that stores instructions that, when executed by the processor 133, causes the processor 133 to perform a method or control scheme as described herein. While the embodiment depicted in FIG. 2 includes a single non-transitory computer-readable memory, other embodiments may include more than one memory module.

The input/output hardware 105 may include a monitor, keyboard, mouse. printer, camera, microphone, speaker, and/or other device for receiving, sending, and/or presenting data. The network interface hardware 106 may include any wired or wireless networking hardware, such as a modem, LAN port, Wi-Fi card, WiMax card, mobile communications hardware, and/or other hardware for communicating with other networks and/or devices.

Figure 3:
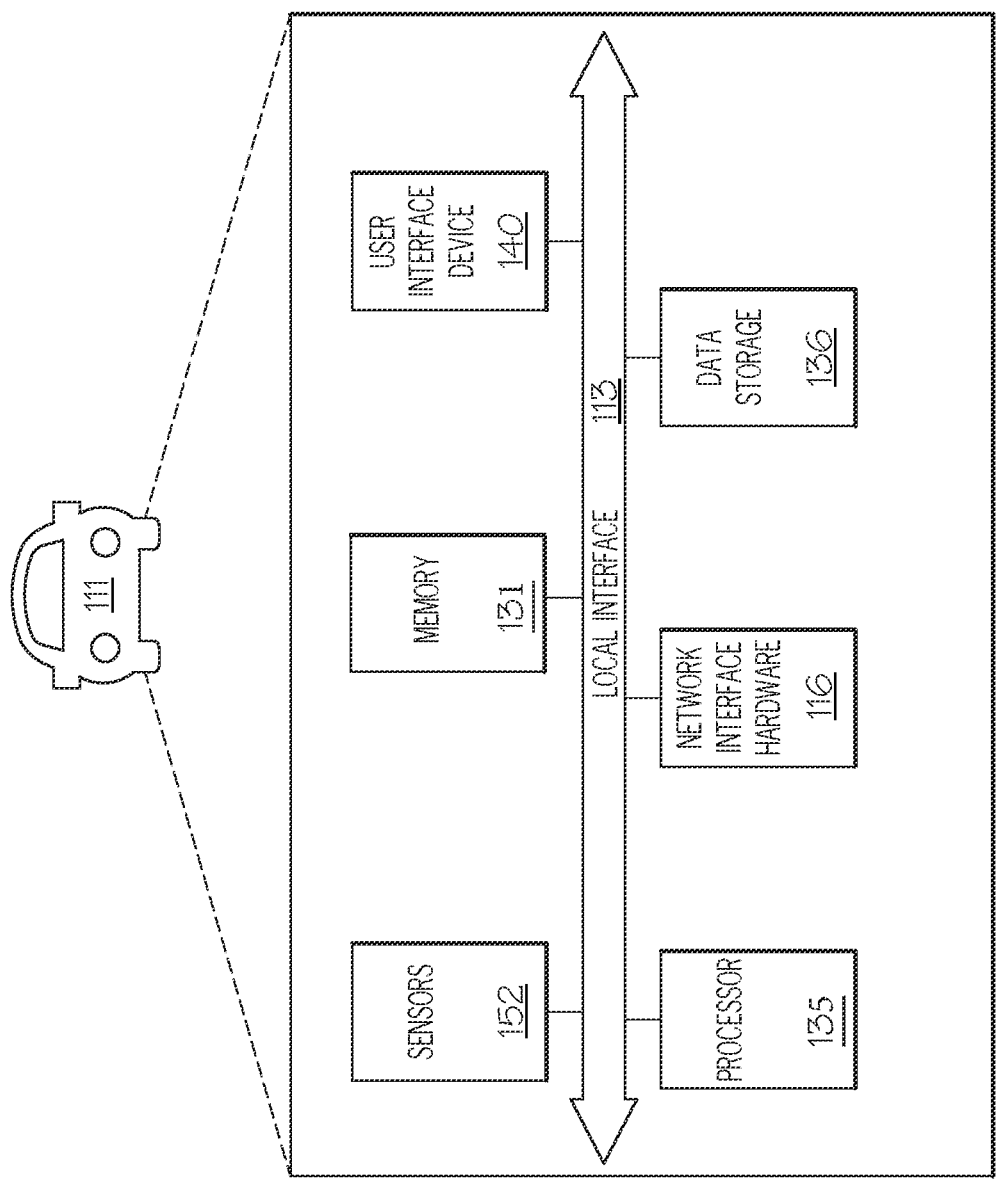
FIG. 3 schematically depicts non-limiting components of the devices on the vehicles of the system for generating a heat map of FIG. 1, according to one or more embodiments shown and described herein.

Referring to FIG. 3, non-limiting components of the devices on the vehicle 111 of the system for generating a heat map 700 are depicted. The vehicle 111 may comprise various components, such as a memory 131, a vehicle processor 135, a user interface device 140, a network interface hardware 116, a data storage component 136, a local interface 113, and sensors 152.

The vehicle 111 may include a controller that may be any device or combination of components comprising a vehicle processor 135 and a memory 131, such as a non-transitory computer readable memory. The vehicle processor 135 may be any device capable of executing the machine-readable instruction set stored in the non-transitory computer readable memory. Accordingly, the vehicle processor 135 may be an electric controller, an integrated circuit, a microchip, a computer, or any other computing device. The vehicle processor 135 may include any processing component(s) configured to receive and execute programming instructions (such as from the data storage component 136 and/or the memory 131). The instructions may be in the form of a machine-readable instruction set stored in the data storage component 136 and/or the memory 131. The vehicle processor 135 is communicatively coupled to the other components of the controller by the local interface 113. Accordingly, the local interface 113 may communicatively couple any number of processors 135 with one another, and allow the components coupled to the local interface 113 to operate in a distributed computing environment. The local interface 113 may be implemented as a bus or other interface to facilitate communication among the components of the vehicle 111. In some embodiments, each of the components may operate as a node that may send and/or receive data. While the embodiment depicted in FIG. 3 includes a single processor, other embodiments may include more than one processor.

The memory 131 and network interface hardware 116 in the vehicle 111 in FIG. 3 may be similar to the memory 132 and network interface hardware 106 in the server 171 as illustrated in FIG. 2. While the embodiment depicted in FIG. 3 includes a single non-transitory computer-readable memory, other embodiments may include more than one memory.

The vehicle 111 and/or system 100 may include a user interface device 140. The user interface device 140 may be associated with or implemented as part of the vehicle 111. In other embodiments, the user interface device 140 may be a remote device (e.g., mobile device, laptop, desktop, tablet, etc.). A user interface device 140 associated with the vehicle 111 is a device or technology that can be used in a vehicle 111 to provide various functions and services to the user. In embodiments, these devices can be installed in the vehicle 111, connected to the processor 133 of the vehicle 111 and/or communicate directly or wirelessly via the local interface 113. Some examples of vehicle user devices include in-vehicle infotainment systems (IVI), heads-up displays (HUD), rear-seat entertainment systems, smartphone integration systems, and/or the like. These devices can be used for a variety of purposes such as navigation, entertainment, communication, safety, and vehicle management. In embodiments, the user interface device 140 may be used to provide vehicle swarm data in addition to providing the heat map 700 to the user. Further, the user interface device 140 may be communicatively coupled to the other components of the system 100 through the network 151, the network interface hardware 116, or the local interface 113

The system 100 and/or vehicle 111 may include one or more vehicle sensors 152 configured to output vehicle data. As a part of the vehicle swarm 101, this data creates vehicle swarm data. The vehicle swarm data may include information indicative of the vehicle performance and the vehicle occupants. In embodiments, vehicle swarm data may not be provided by the vehicle sensors 152 or only by the vehicle sensors 152. In embodiments the vehicle data is generated by vehicle processor 135 and stored within the memory 131 of the vehicle 111 and within the data storage component 136, as described below. However, in other embodiments, the vehicle data may be generated by the processor 133 of the server 171.

The one or more vehicle sensors 152 may include, but are not limited to, proximity sensors, microphones or audio sensors, one or more cameras, a global positioning system (GPS), weather sensors, speed sensors, steering wheel sensors, LIDAR and RADAR systems, vehicle API and UI, vehicle-to-vehicle communication paths, vehicle telematics sensors (e.g., acceleration sensors, braking sensors, steering sensors, yaw sensors, fuel consumption sensors, accident sensors, lane departure sensors, impact sensors, etc.), and the like. These sensors may collect data, such as but not limited to, acceleration data, braking data, steering data, brake usage, lane departures, routes, time, location, fuel consumption, idling, distance traveled, accidents, historical location data, current accessory data, software data, occupant data, and the like.

A proximity sensor may be any device or combination of components capable of outputting a signal indicative of the presence or absence of an object within or near the vehicle 111. The proximity sensor may also be a sensor capable of determining a range or distance to an object, for example the distance from the vehicle and another vehicle that is traveling in front of the vehicle 111. In some embodiments, one or more proximity sensors may be configured to enable an around view monitoring system for the vehicle 111.

A microphone or audio sensor may be any device capable of transforming a mechanical vibration associated with sound into an electrical signal indicative of the sound. In embodiments, the microphone may be used to monitor sound levels for purposes such as determining the existence of traffic, infotainment settings, etc. In other embodiments, the microphone may be used to monitor words spoken within the vehicle 111 that may indicate desires of a driver or occupants of the vehicle 111.

The one or more cameras may enable a variety of different monitoring. detection, control, and/or warning systems within a vehicle 111. The one or more cameras may be any device having an array of sensing devices (e.g., a CCD array or active pixel sensors) capable of detecting radiation in an ultraviolet wavelength band, a visible light wavelength band, or an infrared wavelength band.

The global positioning system, or GPS, is capable of generating location information indicative of a location of the vehicle 111 by receiving one or more GPS signals from one or more GPS satellites. In embodiments, the GPS signal is communicated to the vehicle processor 135. In some embodiments, the GSP signal is communicated to the processor 133 of the server. The signal may include location information comprising a National Marine Electronics Association (NMEA) message, a latitude and longitude data set, a street address, a name of a known location based on a location database, or the like. Additionally, the GPS may be interchangeable with any other system capable of generating an output indicative of a location. For example, a local positioning system that provides a location based on cellular signals and broadcast towers or a wireless signal detection device capable of triangulating a location by way of wireless signals received from one or more wireless signal antennas.

Weather sensors may be temperature sensors, precipitation gauges, wind meters, UV light sensors, or the like. The weather sensors may be any device capable of outputting a signal indicative of a weather condition such as a temperature level, the presence or an amount of precipitation, the direction and/or speed of the wind, the presence and/or intensity of sunlight or the like. Weather sensors may provide information which may be relevant to driving conditions of the vehicle 111.

A vehicle speed sensor may be any sensor or system of sensors for generating a signal indicative of vehicle speed. For example, without limitation, a vehicle speed sensor may be a tachometer that is capable of generating a signal indicative of a rotation speed of a shaft of the vehicle engine or a drive shaft. In some embodiments, the vehicle speed sensor comprises an opto-isolator slotted disk sensor, a Hall Effect sensor, a Doppler radar, or the like. The vehicle speed sensor may be provided so that the processor 133 may determine when the vehicle 111 accelerates, maintains a constant speed, slows down or is comes to a stop.

A steering wheel sensor system may comprise a plurality of sensors located in the steering wheel for determining a driver grip on the steering wheel, the degree of rotation applied to the steering wheel or the forces applied in turning or maintaining the steering wheel. The steering wheel sensor system may provide signals to the one or more processors 133, 135 indicative of the location and number of hands on the steering wheel, the strength of the grip on the steering wheel, or changes in position of one or more hands on the steering wheel. The steering wheel sensor system, for example, without limitation, may include pressure sensors, inductive sensors, optical sensors, or the like. In addition to detecting the location, number, grip, and change in position of one or more hands on the steering wheel, the steering wheel sensor system may also include one or more sensors indicating the rotational angle of the steering wheel and provide corresponding signals to the processor 133. Such information may be relevant to driving behaviors of the owner or occupant.

A LIDAR system or light detection and ranging is a system and method of using pulsed laser light to measure distances from the LIDAR system to objects that reflect the pulsed laser light. In embodiments, the LIDAR systems can be used by vehicles to provide detailed 3D spatial information for the identification of objects near a vehicle 111, as well as the use of such information in the service of systems for vehicular mapping, navigation and autonomous operations, especially when used in conjunction with geo-referencing devices such as GPS or a gyroscope-based inertial navigation unit or related dead-reckoning system.

The vehicle UI or user interface device 140 allows the user of the vehicle 111 to interact and control the vehicle. In embodiments, the vehicle UI can be used to provide information regarding the occupants of the vehicle 111 and generate vehicle occupant data. This information may include, but is not limited to a user's preferences for vehicle settings, for example stereo settings, lighting levels, seat settings, and outside communications, personal information, for example, personal identifying information and demographic information, location data, usage data, or the like.

The vehicle API or application programming interface is a set of protocols. routines and tools that allow software applications to communicate with the vehicle 111 processor 133. The vehicle API provides usage data from the vehicle including location data, diagnostic data, maintenance data, trip data, and other information related to the performance and status of the vehicle 111. Other data sources are contemplated and possible, such as vehicle telematics data.

Vehicle performance data is output by the one or more vehicle sensors 152 as described above, for example the proximity sensors, one or more cameras, a global positioning GPS, weather sensors, speed sensors, steering wheel sensors, LIDAR and RADAR systems, vehicle APIs, vehicle-to-vehicle communication paths, and vehicle telematics sensors. The vehicle performance data may relate to how well the vehicle 111 performs, including on speed, acceleration, braking, fuel efficiency, power, torque, handling, suspension and other feedback useful to determining the performance of the vehicle 111. Based upon vehicle performance data, the system 100 may generate the difficult road topography. For example, the difficult road topography may be determined based on one of rates of decelerations, angles of steering, or a road condition, determined from one of the above sensors.

Vehicle occupant data includes data related to the people who are riding in the vehicle 111 at a particular time and may be generated by vehicle sensors 152. For example, vehicle sensors 152 like the cameras and audio sensors can help determine vehicle occupant data related to the number of occupants, physical characteristics, interactions with the vehicle 111 (e.g. conversations using vehicle microphone, interactions with user interface, interactions from connected user devices, etc.), vehicle settings (e.g. seat, air conditioning, music, sound system settings, etc.) and the like. Based upon vehicle performance data, the system 100 may generate the difficult road topography. For example, the difficult road topography may be determined based on one of a driver's discomfort, a driver's alertness, or an occupant's comments.

The data storage component 136 stores historical vehicle performance data and vehicle occupant data. Other data stored in the data storage component 136 may include other sensor data, vehicle ownership data, data about previous accidents the vehicle has been involved in, previous damage to the vehicle, insurance information, registration, demographic information and the like. Other data may include accessory data, for example, tow packages, driving modes, software installed on the vehicle or any other relevant data.

Figure 4:
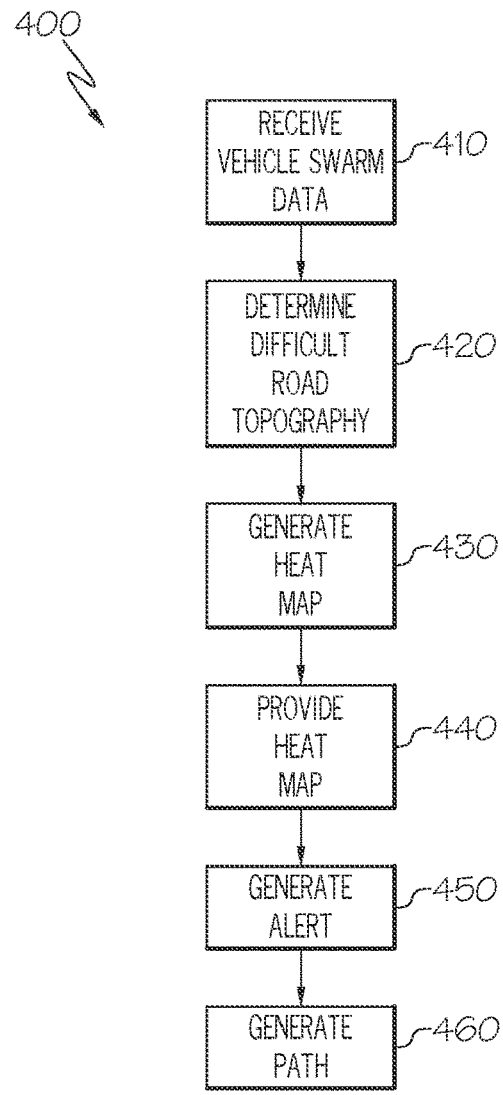
FIG. 4 depicts a flowchart of an example method for a providing a heat map to a user device, according to one or more embodiments shown and described herein.

Now referring to FIG. 4, a flowchart 400 of an example method for providing a heat map 700 (FIG. 7) corresponding to the difficult road topography is depicted. As described above, the method may be carried out by the processor 135 of the vehicle 111, the processor 133 of the server 171, or a combination of both. The flowchart 400 depicted in FIG. 4 is a representation of a machine-readable instruction set stored in the one or more memories 131, 132, and executed by the one or more processors 133, 135. The process of the flowchart 400 in FIG. 4 may be executed at various times and in response to inputs or other signals from the user interface device 140 communicatively coupled to the processor 133 or the vehicle processor 135. In other embodiments, the process of the flowchart 400 may be executed as directed by a remote source or otherwise automatically without the input of a user.

In particular, at block 410, the logic executed by the one or more processors 133, 135 cause the one or more processors 133, 135 to generate or receive vehicle swarm data related to one or more of vehicle performance data and vehicle occupant data, as described above. As noted above, sources of data may include the one or more vehicle sensors 152 from the vehicle swarm 101 (e.g., data with respect to vehicle operation (e.g., speed, acceleration, braking, turning etc.), data with respect to vehicle settings (e.g., infotainment settings, HVAC settings, navigation settings, etc.), data with respect to vehicle occupants (e.g., conversation data (such as received via a microphone), vehicle type information (e.g., sport car, sport utility vehicle, utility vehicle, etc.). In some embodiments, vehicle occupant data includes information from social media accounts, browsing histories, or the like. Other sources of vehicle swarm data are contemplated and possible. However, in embodiments, at least a portion of the data may be generated by the one or more vehicle sensors 152 of the vehicle swarm 101, which may provide real-time or near real-time updates to vehicle operation and/or vehicle occupants.

In embodiments, logic stored in the memory 131 of the vehicle 111 causes the vehicle processor 135 to cause the one or more vehicle sensors 152 of the vehicle swarm 101 to generate vehicle performance data. In embodiments, the vehicle processor 135 communicates via the network interface hardware 116, the vehicle performance data and vehicle occupant data to the server 171.

At block 420, the one or more processors 133 determine the difficult road topography based on the vehicle swarm data. In embodiments, the road topography includes at least one of a short ramp, a pot hole, a difficult junction, a sharp turn, a sharp curve, a flooded roadway, a blind spot, a sharp incline or decline, or an icy bridge. In other embodiments, the difficult road topography may be temporary discomforts, for example, unplowed roads, flooded streets, or construction. The determination of difficult road topography may be based on at least one of rates of decelerations, angles of steering, likelihood to be in an accident, a driver's discomfort, or the driver's alertness as described above. In some embodiments, the determination of difficult road topography may further be based on other comments or blog posts. It should be understood in some embodiments, the vehicle processor 135 may determine the difficult road topography based on the vehicle swarm data.

In some embodiments, the system 100 determines that the road topography is difficult based upon the vehicle swarm data. In other embodiments, the system determines the type of difficult road topography based upon the vehicle swam data. As a non-limiting example, the vehicle 111 produces data of a harsh lateral acceleration by the driver. In this example, the one or more processors 133 may determine the type of difficult road topography is a strange junction. In embodiments, the processor 133 implements the machine-learning model 122 to determine the difficult road topography and the type of difficult road topography. As another non-limiting example. vehicle sensors 152 may indicate that a user suddenly decelerates and sharply turns the steering wheel off the highway. In this example, the system 100 may indicate a difficult road topography of a short off ramp.

At block 430, the system 100 generates the heat map 700 of the difficult road topography. The heat map 700 is based upon an aggregate number of times that a determination is made that a location has difficult road topography. As each vehicle 111 in the vehicle swarm 101 supplies vehicle swarm data, a multitudes of difficult road topographies are supplied into the system 100. As such, the system 100 can aggregate the number of determined difficult road topographies into a heat map 700. However, it should be understood that data supplied from one vehicle 111 may also be used to create the heat map 700.

For example, the more determinations that are made that a location has difficult road topography based upon the vehicle swarm data, the 'hotter' that spot will be on the heat map. The less determinations of difficult road topography a location has, the 'cooler' the color. In embodiments, the heat map 700 is comprised of a first color 702 at a location of determined difficult road topography greater than a threshold and a second color 704 at a location of determined difficult road topography less than a threshold.

As a non-limiting example, the vehicle sensors 152 may output data regarding tire pressure decrease in a set amount of time. The system 100 uses the period of time to calculate the location a pot hole was likely to have occurred therefore causing a determination of a difficult road topography. Another vehicle 111 in the vehicle swarm 101 has a flat tire at the same location and the system 100 determines a difficult road topography. The more vehicle 111 having determinations of difficult road topography at a location, the 'hotter' the location will be on the heat map 700.

As stated above, at block 420, the system 100 can determine a type of road topography. When generating the heat map 700 at block 430, in some embodiments, the heat map 700 is organized by type of topography. In such embodiments, as seen in more detail below, the user can toggle by type of topography.

At block 440, the system 100, such as the server 171, may provide the heat map 700 to a user though a user device. The heat map 700 may be sent and/or displayed on the user interface device 140 associated with the vehicle 111. In some embodiments, the heat map 700 may be sent to a personal user device (e.g., mobile device, computer, etc.). The user interface device 140, as described above, may be a vehicle head unit, or a mobile device that is associated with the vehicle 111. In embodiments, as seen in more detail below, the heat map 700 provided to the user through the user interface device 140 allows for user interaction and manipulation.

As a non-limiting example, users of the heat map 700 may include an autonomous vehicle 111, a driver of a non-autonomous vehicle 111, navigation services, urban planners, and civil engineers, insurance companies assessing risk and validating claims for determination is road condition contributed to incidents, transportation departments, and emergency services anticipating challenges, researchers, and the general public.

At block 450, the logic executed by the one or more processors 133, 135 cause the one or more processors 133, 135 to generate an alert to a driver of a vehicle that is approaching a location with a number of determined difficult road topographies above a threshold. For example, a driver approaches a strange junction that has been determined a number of times to be a difficult road topography. As the driver approaches the strange junction, the system 100 generates an alert to the driver to warn of the strange junction. As such, the driver will be more prepared to approach and safely correct as needed.

At block 460, the logic executed by the one or more processors 133, 135 cause the one or more processors 133, 135 to generate a path for an autonomous vehicle 111 with a minimal amount of locations having a number of determined difficult road topographies above a threshold. As a non-limiting example, the autonomous vehicle 111 can use the heat map 700 to plan a route that avoids areas with challenging road features. The autonomous vehicle 111 then autonomously drives along the planned route. The ride can minimize abrupt maneuvers or risky situation to provide a more comfortable ride to the user. Additionally, in embodiments, the autonomous vehicle 111 may use the heat map 700 to identify areas with sharp curves, or other difficult features to adjust speed and decision making algorithms in advance. In some embodiments, the heat map 700 may be used to validate the accuracy and effectiveness of the vehicle 111 sensor data.

Figure 5:
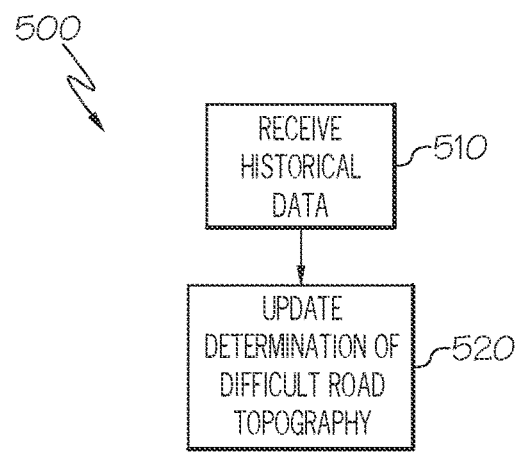
FIG. 5 depicts a flowchart of an example method for a providing a heat map including a toggle for different weather, according to one or more embodiments shown and described herein.

Now referring to FIG. 5, a flowchart 500 of an example method for providing a heat map 700 including historical data and weather is depicted. In particular, at block 510, the logic executed by the one or more processors 133, 135 cause the one or more processors 133. 135 to generate or receive historical data including at least historical road data and weather data, as described above. This data may include road characteristics (layout, geometry, signs, widths, markings, etc.), traffic patterns (congestions, flow during times of day, days of the week, seasons, etc.), accident and incident data, weather (temperature, precipitation, visibility, etc.), infrastructure changes (maintenance, repairs, upgrades, expansion, etc.), mapping (popular paths, GPS), feedback and comments, regulatory changes and the like.

At block 520, the system 100 updates the determination of difficult road topography based on the historical data. For example, the historical data includes time and weather and the vehicle sensor 152 may provide data indicating a sharp deceleration. In this example, the system 100 indicates this as a possible difficult road topography. Additionally, there are other sharp decelerations at this location. However, all other sharp decelerations are during rush hour traffic. The current deceleration was in the middle of the night, therefore, the system 100 will reconsider the determination of difficult road topography based on the sharp deceleration.

In embodiments, the difficult road typography may be categorized by weather. For example, by snowy conditions, rainy conditions, icy conditions, foggy and the like. In other embodiments, the difficult road topography may be categorized by the time of day.

Figure 6:
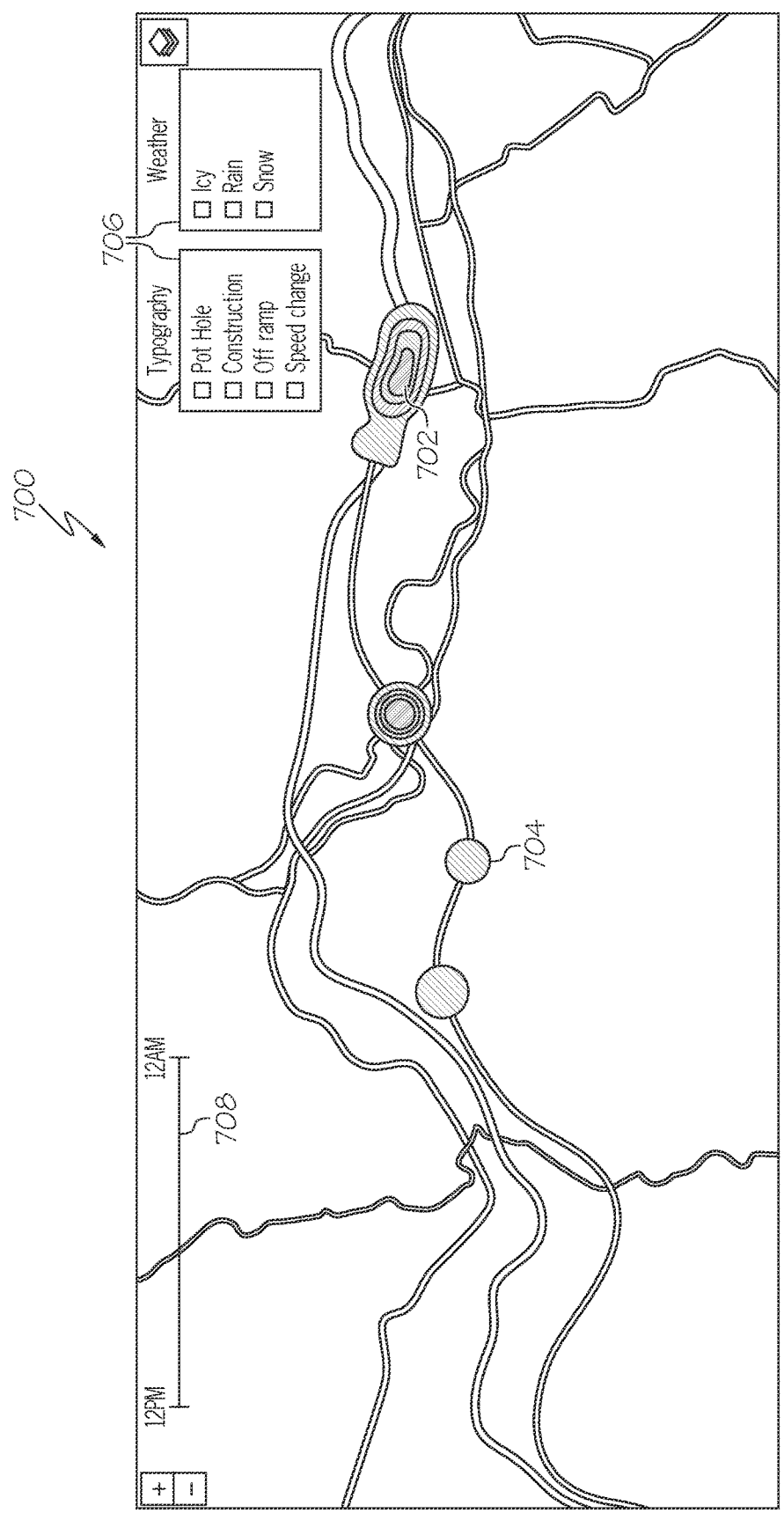
FIG. 6 depicts an example of a heat map, according to one or more embodiments shown and described herein.

Referring now to FIG. 6, an example of a heat map 700 is illustrated. In the illustrated embodiment, a location with a difficult road topography greater a threshold is depicted in a first color 702. Further, a location with difficult road topography less than a threshold is depicted in a second color 704. In embodiments, locations with difficult road topography between the two thresholds may be presented as gradients between the two colors. Additionally, toolbars 706 are presented to allow a user to select filters to toggle weather or a type of difficult road typography, as described above. In embodiments, a sliding bar 708 is engageable by the user to change the difficult road typography at the time of day It should now be understood that embodiments disclosed herein are directed to systems and methods for generating heat maps to a user or vehicle corresponding to map topographies with areas to avoid or for road improvements. The system may receive vehicle swarm data from a plurality of vehicles, reflecting driving behaviors, environmental conditions, accelerations, braking events, steering wheel angles, and crash related information. Based on the data, the system may generate a difficult road topography. For example detecting harsh lateral accelerations by drivers, the system may identify a strange junction. The system may aggregate the identified difficult road topographies to generate a heat map. The heat map enables users such as human drivers and autonomous vehicles to leverage machine learning and data analytics to navigate safely and avoid difficult road sections. Further, civil engineers and urban planners can leverage the heat map to prioritize road improving projects, enhance road safety, allocate resources, and infrastructure.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for generating a heat map corresponding to a difficult road topography, the system comprising:
   one or more processors;
   network interface hardware communicatively coupled to the one or more processors;
   one or more memory modules communicatively coupled to the one or more processors that store machine-readable instructions that when executed by the one or more processors, cause the system to:
   receive vehicle swarm data related to at least a vehicle performance and a vehicle occupant, wherein at least a portion of the vehicle swarm data is generated by one or more vehicle sensors mounted to a vehicle of a vehicle swarm;
   determine the difficult road topography based on the vehicle swarm data;
   generate a heat map of the difficult road topography, wherein the heat map is based upon an aggregate number of times that a determination is made that a location has difficult road topography;
   provide the heat map to a user though a user device;
   receive historical data including at least historical road data and weather data; and
   update the difficult road topography based on the historical data, wherein the heat map includes a toggle for the user to view the heat map in different weather.

2. The system of claim 1, wherein the difficult road topography includes at least one of a short ramp, a pot hole, a difficult junction, a sharp turn, a sharp curve, a flooded roadway, a blind spot, a sharp incline or decline, or an icy bridge.

3. The system of claim 1, wherein the difficult road topography is determined based on at least one of rates of decelerations, angles of steering, a likelihood to be in an accident, a driver's discomfort, or a driver's alertness.

4. The system of claim 1, wherein the heat map is comprised of a first color at a location of determined difficult road topography greater than or equal to a threshold and a second color at a location of determined difficult road topography less than the threshold.

5. The system of claim 1, wherein the vehicle sensors include at least one of a GPS, a predictive maintenance API, one or more cameras, one or more ultrasonic sensors, one or more audio sensors, or an echo location mapping.

6. The system of claim 1, wherein the machine-readable instructions further causes the system to:
   determine a type of road topography based on the vehicle swarm data; and
   organize the heat map based on the type of road topography, wherein the user can toggle the type of road topography.

7. The system of claim 1, wherein the heat map includes a toggle for the user to view the difficult road topography at different times of a day.

8. The system of claim 1, wherein
the vehicle is non-autonomous; and
the machine-readable instructions further cause the system to:
generate an alert to a driver of the vehicle when the vehicle approaches a location of determined difficult road topography above a threshold.

9. The system of claim 1, wherein
the vehicle is autonomous; and
the machine-readable instructions further cause the system to:
generate a path with a minimal amount of locations of determined difficult road topography above a threshold.

10. A method for generating a heat map corresponding to a difficult road topography, the method comprising:
receiving vehicle swarm data related to at least a vehicle performance and a vehicle occupant, wherein at least a portion of the vehicle swarm data is generated by one or more vehicle sensors mounted to a vehicle of a vehicle swarm;
determining the difficult road topography based on the vehicle swarm data;
generating a heat map of the difficult road topography, wherein the heat map is based upon an aggregate number of times that a determination is made that a location has difficult road topography;
providing the heat map to a user though a user device;
receiving historical data including at least historical road data and weather data; and
updating the difficult road topography based on the historical data, wherein the heat map includes a toggle for the user to view the heat map in different weather.

11. The method of claim 10, wherein the difficult road topography includes at least one of a short ramp, a pot hole, a difficult junction, a sharp turn, a sharp curve, a flooded roadway, a blind spot, a sharp incline or decline, or an icy bridge.

12. The method of claim 10, wherein the difficult road topography is determined based on at least one of rates of decelerations, angles of steering, likelihood to be in an accident, a driver's discomfort, or the driver's alertness.

13. The method of claim 10, wherein the heat map is comprised of a first color at a location of determined difficult road topography greater than or equal to a threshold and a second color at a location of determined difficult road topography less than the threshold.

14. The method of claim 10, wherein the vehicle sensors include at least one of a GPS, a predictive maintenance API, one or more cameras, one or more ultrasonic sensors, one or more audio sensors, or an echo location mapping.

15. The method of claim 10, wherein the method further comprises:
determining a type of road topography based on the vehicle swarm data; and
organizing the heat map based on the type of road topography, wherein the user can toggle the type of road topography.

16. The method of claim 10, wherein the heat map includes a toggle for the user to view the difficult road topography at different times of a day.

17. The method of claim 10, wherein the method further comprises:
generating an alert to a driver of a non-autonomous vehicle when the vehicle approaches a location of determined difficult road topography above a threshold.

18. The method of claim 10, wherein the method further comprises:
generating a path for an autonomous vehicle with a minimal amount of locations of determined difficult road topography above a threshold.

* * * * *